(12) United States Patent
Moran et al.

(10) Patent No.: US 11,900,131 B2
(45) Date of Patent: Feb. 13, 2024

(54) DYNAMIC REMEDIATION ACTIONS IN RESPONSE TO CONFIGURATION CHECKS IN AN INFORMATION PROCESSING SYSTEM

(71) Applicant: EMC IP Holding Company LLC, Hopkinton, MA (US)

(72) Inventors: John Moran, Mebane, NC (US); Anurag Sharma, Cedar Park, TX (US); Christopher Trudel, Georgetown, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 105 days.

(21) Appl. No.: 17/071,407

(22) Filed: Oct. 15, 2020

(65) Prior Publication Data
US 2022/0121458 A1 Apr. 21, 2022

(51) Int. Cl.
G06F 9/445 (2018.01)
G06F 21/44 (2013.01)

(52) U.S. Cl.
CPC ...... G06F 9/44552 (2013.01); G06F 9/44505 (2013.01); G06F 21/44 (2013.01)

(58) Field of Classification Search
CPC . H04L 41/0816; H04L 43/0829; H04L 41/16; H04L 41/147; H04L 43/0817; H04L 41/0823; H04L 41/0893; H04L 43/04; G06F 2009/45595; G06F 9/45558; G06F 2009/45591; G06F 21/55; G06F 11/008;
(Continued)

(56) References Cited

U.S. PATENT DOCUMENTS 5,381,539 A 1/1995 Yanai et al.
5,551,003 A 8/1996 Mattson et al.
(Continued)

FOREIGN PATENT DOCUMENTS

WO PCT/US2019/024885 1/2020
WO PCT/US2019/024900 1/2020

OTHER PUBLICATIONS

Dell EMC, "Dell EMC VxRack FLEX," Dell EMC Product Overview, 2018, 5 pages.
(Continued)

Primary Examiner — Faisal M Zaman
(74) Attorney, Agent, or Firm — Ryan, Mason & Lewis, LLP

(57) ABSTRACT

Techniques comprise receiving results from one or more configuration checks performed on one or more elements of an information processing system, wherein the results are received from a set of one or more interfaces of the information processing system and comprise an indication of detection of a configuration issue with at least a portion of the one or more elements of the information processing system. The method generates one or more remediation actions based on at least a portion of the received results, and then causes initiation of the one or more remediation actions within the information processing system at least in part through the set of one or more interfaces of the information processing system from which the results are received to effectuate remediation of the configuration issue with the portion of the one or more elements of the information processing system.

17 Claims, 7 Drawing Sheets

(58) Field of Classification Search
CPC ............. G06F 11/0751; G06F 11/0781; G06F 11/3476
USPC ............... 709/224, 220, 221; 714/43, 49, 57
See application file for complete search history.

(56) References Cited

U.S. PATENT DOCUMENTS

| | | | |
|---|---|---|---|
| 5,764,880 A | 6/1998 | Gerdt et al. | |
| 6,052,799 A | 4/2000 | Li et al. | |
| 6,941,420 B2 | 9/2005 | Butterworth et al. | |
| 8,843,676 B2 | 9/2014 | Rajamanickam et al. | |
| 8,954,574 B1* | 2/2015 | Chheda | H04L 41/0826 709/224 |
| 9,021,310 B1* | 4/2015 | McCabe | H04L 41/0645 714/43 |
| 9,195,573 B1* | 11/2015 | Giammaria | G06F 8/65 |
| 9,372,751 B2 | 6/2016 | McNutt | |
| 9,514,014 B2 | 12/2016 | Webman et al. | |
| 9,535,727 B1* | 1/2017 | Jerbi | G06F 9/44505 |
| 9,578,017 B2* | 2/2017 | Ferguson | G06F 12/08 |
| 9,892,045 B1 | 2/2018 | Douglis et al. | |
| 10,078,598 B1 | 9/2018 | Wallace et al. | |
| 10,223,145 B1* | 3/2019 | Neogy | G06F 11/0781 |
| 10,225,152 B1* | 3/2019 | Roth | G06F 21/6236 |
| 10,331,561 B1 | 6/2019 | Shilane et al. | |
| 10,445,180 B2 | 10/2019 | Butterworth et al. | |
| 10,484,257 B1* | 11/2019 | Louca | H04L 43/04 |
| 10,721,142 B1* | 7/2020 | Mathur | H04L 41/5067 |
| 10,740,169 B1* | 8/2020 | Passaretti | G06F 11/0709 |
| 11,188,413 B1* | 11/2021 | Ghatak | G06F 11/0727 |
| 2002/0032835 A1 | 3/2002 | Li et al. | |
| 2006/0182041 A1* | 8/2006 | Graves | H04L 41/0893 370/254 |
| 2008/0021853 A1 | 1/2008 | Modha et al. | |
| 2009/0204761 A1 | 8/2009 | Caprioli et al. | |
| 2009/0276593 A1 | 11/2009 | Jacobson et al. | |
| 2010/0174812 A1* | 7/2010 | Thomas | G06F 21/305 709/224 |
| 2011/0154314 A1* | 6/2011 | Balasubramanian | G06Q 10/00 717/171 |
| 2012/0096104 A1* | 4/2012 | Hironaka | H04N 21/4424 709/212 |
| 2012/0102363 A1* | 4/2012 | Milojicic | G06F 11/079 714/E11.178 |
| 2012/0222014 A1* | 8/2012 | Peretz | G06F 11/3684 717/125 |
| 2013/0305002 A1 | 11/2013 | Hallak et al. | |
| 2014/0189873 A1* | 7/2014 | Elder | H04L 63/1433 726/25 |
| 2014/0244935 A1 | 8/2014 | Ezra et al. | |
| 2014/0245238 A1* | 8/2014 | Wang | G06F 30/398 716/52 |
| 2014/0289853 A1* | 9/2014 | Teddy | G06F 21/566 726/23 |
| 2014/0331326 A1* | 11/2014 | Thakur | H04L 63/1433 726/25 |
| 2014/0359776 A1* | 12/2014 | Liu | H04L 63/14 726/25 |
| 2015/0040231 A1* | 2/2015 | Oliphant | G06F 21/50 726/25 |
| 2015/0178634 A1* | 6/2015 | Chen | G06Q 10/10 706/14 |
| 2016/0103764 A1 | 4/2016 | Banerjee et al. | |
| 2016/0357625 A1* | 12/2016 | Balakrishnan | G06F 11/079 |
| 2016/0366185 A1* | 12/2016 | Lee | G06F 9/45558 |
| 2017/0126523 A1* | 5/2017 | Chen | H04L 41/069 |
| 2017/0243009 A1* | 8/2017 | Sejpal | G06F 21/577 |
| 2017/0302554 A1* | 10/2017 | Chandrasekaran | H04W 8/02 |
| 2018/0007014 A1* | 1/2018 | Neal | H04L 9/0822 |
| 2018/0113640 A1 | 4/2018 | Fernandez et al. | |
| 2018/0267893 A1 | 9/2018 | Barzik et al. | |
| 2018/0300075 A1 | 10/2018 | Fernandez et al. | |
| 2018/0336356 A1* | 11/2018 | Papaxenopoulos | G06F 8/65 |
| 2019/0227829 A1* | 7/2019 | Schnee | G06F 9/45558 |
| 2019/0227845 A1 | 7/2019 | Sridhar et al. | |
| 2019/0310862 A1* | 10/2019 | Mortensen | G06F 9/4401 |
| 2019/0317849 A1* | 10/2019 | Cmielowski | G06F 11/0772 |
| 2020/0034284 A1* | 1/2020 | Solan | G06F 9/45541 |
| 2020/0117734 A1* | 4/2020 | Sylos | G06F 40/30 |
| 2020/0204452 A1* | 6/2020 | Bhat | H04L 12/2854 |
| 2020/0313861 A1* | 10/2020 | Troia | G06F 3/0673 |
| 2020/0348995 A1* | 11/2020 | Venkataraman | G06F 11/0793 |
| 2021/0083926 A1* | 3/2021 | Costa | H04L 41/0686 |
| 2021/0089384 A1* | 3/2021 | Eberlein | G06F 11/0793 |
| 2021/0216389 A1* | 7/2021 | Heredia | G06F 11/0721 |
| 2021/0273846 A1* | 9/2021 | Chaparala | H04L 41/16 |
| 2021/0303388 A1* | 9/2021 | George | G06F 11/0793 |
| 2021/0326196 A1* | 10/2021 | Moss | G06F 11/3692 |
| 2022/0066860 A1* | 3/2022 | Sloane | G06F 11/0793 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006.1598129, pp. 200-211.
Wikipedia, "Raft (Computer Science)," https://en.wikipedia.org/wiki/Raft_(computer_science), Feb. 10, 2020, 4 pages.
Wikipedia, "Paxos (Computer Science)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
Project Jupyter, "Jupyter Conference," https://jupyter.org/, Oct. 6, 2020, 11 pages.
U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."
U.S. Appl. No. 16/807,709 filed in the name of Avi Puder et al. filed Mar. 3, 2020, and entitled "Management of Shared Resources in a Software-Defined Storage Environment."
U.S. Appl. No. 16/822,818 filed in the name of Itay Keller et al. filed Mar. 18, 2020, and entitled "Storage System Implementing Snapshot Longevity Ranking for Efficient Management of Snapshots."
U.S. Appl. No. 16/822,848 filed in the name of Itay Keller et al. filed Mar. 18, 2020, and entitled "Assignment of Longevity Ranking Values of Storage Volume Snapshots Based on Snapshot Policies."

(56) References Cited

OTHER PUBLICATIONS

U.S. Appl. No. 16/823,813 filed in the name of Itay Keller et al. filed Mar. 19, 2020, and entitled "Managing Incompressible Data in a Compression-Enabled Log-Structured Array Storage System."

U.S. Appl. No. 16/830,469 filed in the name of Roi Tagar et al. filed Mar. 26, 2020, and entitled "Storage Block Balancing Using Volume Part Migration."

U.S. Appl. No. 16/830,473 filed in the name of Yugal Peleg Lieblich et al. filed Mar. 26, 2020, and entitled "Replicated State Cluster with Standby Node State Assessment During Leadership Transition."

U.S. Appl. No. 16/830,946 filed in the name of Gil Ben Zeev et al. filed Mar. 26, 2020, and entitled "Storage Volume Migration Scheduling Based on Storage vol. Priorities and Specified Constraints."

U.S. Appl. No. 16/832,763 filed in the name of Michal Yarimi et al. filed Mar. 27, 2020, and entitled "Managing Storage Device Errors During Processing of Inflight Input/Output Requests."

U.S. Appl. No. 16/834,363 filed in the name of Itay Keller et al. filed Mar. 30, 2020, and entitled "Managing Least Recently Used Cache Using Reduced Memory Footprint Sequence Container."

U.S. Appl. No. 16/836,824 filed in the name of Itay Keller et al. filed Mar. 31, 2020, and entitled "Management of Volume Snapshots in a Data Storage System."

U.S. Appl. No. 16/888,742 filed in the name of Rivka Matosevich et al. filed May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al. filed Jul. 1, 2020, and entitled "Sharing Memory Resources Between Asynchronous Replication Workloads."

U.S. Appl. No. 16/983,423 filed in the name of Dan Aharoni et al. filed Aug. 3, 2020, and entitled "Deferred Reclamation of Invalidated Entries that are Associated with a Transaction Log in a Log-Structured Array."

U.S. Appl. No. 17/024,912 filed in the name of Anurag Sharma et al. filed Sep. 18, 2020, and entitled "Automatic Discovery and Configuration of Server Nodes."

U.S. Appl. No. 17/065,754 filed in the name of Dan Aharoni et al. filed Oct. 8, 2020, and entitled "Direct Response to IO Request in Storage System with Remote Replication."

U.S. Appl. No. 17/070,073 filed in the name of Dan Aharoni et al. filed Oct. 14, 2020, and entitled "Direct Response to IO Request in Storage System Having an Intermediary Target Apparatus."

U.S. Appl. No. 17/070,288 filed in the name of Anurag Sharma et al. filed Oct. 14, 2020, and entitled "Pipeline-Based System for Configuration Checking and Reporting Associated with an Information Processing System."

\* cited by examiner

```
<BestPractice>
  <name>VMware.SIOC</name>
  <applies>hypervisor = VMware</applies>
  <check>
    run: "/etc/init.d/storageRM status"
  </check>
  <return>
    <value>Enabled</value>
    <result>FAIL</result>
    <severity>SEVERE</severity>
    <remediation>message: "SIOC must be disabled at the earliest opportunity to avoid potential data-unavailability"</remediation>
    <value>Disabled</value>
    <result>PASS</result>
    <severity></severity>
    <remediation></remediation>
    <value></value>
    <result>UNDEFINED</result>
    <severity></severity>
    <remediation>message: "Manual Check Required. Unable to run check VMware.SIOC"</remediation>
  </return>
</BestPractice>
```

```
<BestPractice>
  <name>DVSwitch MTU Size</name>
  <applies>hypervisor = VMware</applies>
  <check>
    run: "esxcli network vswitch dvs vmware list..." <truncated for example>
    eval: foreach [switch]
  </check>
  <return>
    <value>9000</value>
    <result>PASS</result>
    <severity></severity>
    <remediation></remediation>
  </return>
  <value><</value>
  <result>FAIL</result>
  <severity>MINOR</severity>
  <remediation_message>: "Incorrect MTU setting on [switch]"</remediation_message>
  <remediation>run: esxcli network vswitch dvs vmware set --m 9000 -v [switch]</remediation>
  </return>
</BestPractice>
```

DYNAMIC REMEDIATION ACTIONS IN RESPONSE TO CONFIGURATION CHECKS IN AN INFORMATION PROCESSING SYSTEM

FIELD

The field relates generally to information processing systems, and more particularly to system configuration remediation in information processing systems.

BACKGROUND

Monitoring and managing the operational health of an information processing system such as, by way of example, a hardware component, an equipment rack, an appliance, a software component, or even a data center itself, is an important part of system configuration management. However, current system scanning tools do not have an ability to do anything with the monitoring results other than report them to a user.

SUMMARY

Illustrative embodiments provide techniques for generating and applying one or more dynamic remediation actions in response to a system configuration check executed in accordance with an information processing system.

For example, in one illustrative embodiment, a method comprises receiving results from one or more configuration checks performed on one or more elements of an information processing system, wherein the results are received from a set of one or more interfaces of the information processing system and comprise an indication of detection of a configuration issue with at least a portion of the one or more elements of the information processing system. The method generates one or more remediation actions based on at least a portion of the received results, and then causes initiation of the one or more remediation actions within the information processing system at least in part through the set of one or more interfaces of the information processing system from which the results are received to effectuate remediation of the configuration issue with the portion of the one or more elements of the information processing system.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIGS. 5A and 5B illustrate check and remediation database examples according to illustrative embodiments.

DETAILED DESCRIPTION

Illustrative embodiments will be described herein with reference to exemplary information processing systems and associated host devices, storage devices, network devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center (or part thereof) or other cloud-based system (or part thereof) that includes one or more clouds hosting multiple tenants that share cloud resources. Numerous different types of enterprise computing and storage systems are also encompassed by the term "information processing system" as that term is broadly used herein.

It is realized herein that the overall health of an information processing system such as, by way of example, an equipment rack, a hardware component, an appliance, a software component, or even a data center including a software-defined storage system, requires ensuring that best practices are applied and that critical issues are remediated. However, it is also realized herein that existing system scanning tools do not have a robust ability to dynamically update their configuration checks, nor do anything with the results other than report them to a user. This means that the job is only half done, i.e., once it is known that some element of the information processing system being managed is outside of best practices or a correctable error is detected, it still has to be fixed.

Illustrative embodiments provide techniques for generating and applying one or more dynamic remediation actions in response to a system configuration check executed in accordance with an information processing system. As used illustratively herein, the term "dynamic" can refer to automated, semi-automated and/or manual implementation of one or more generated remediation actions. For example, some remediation actions may be implemented automatically by the set of system tools that provided the configuration check, some may be implemented manually by an administrator or other user, and some may be implemented by a third party vendor. Non-limiting examples will be given below.

Figure 1:
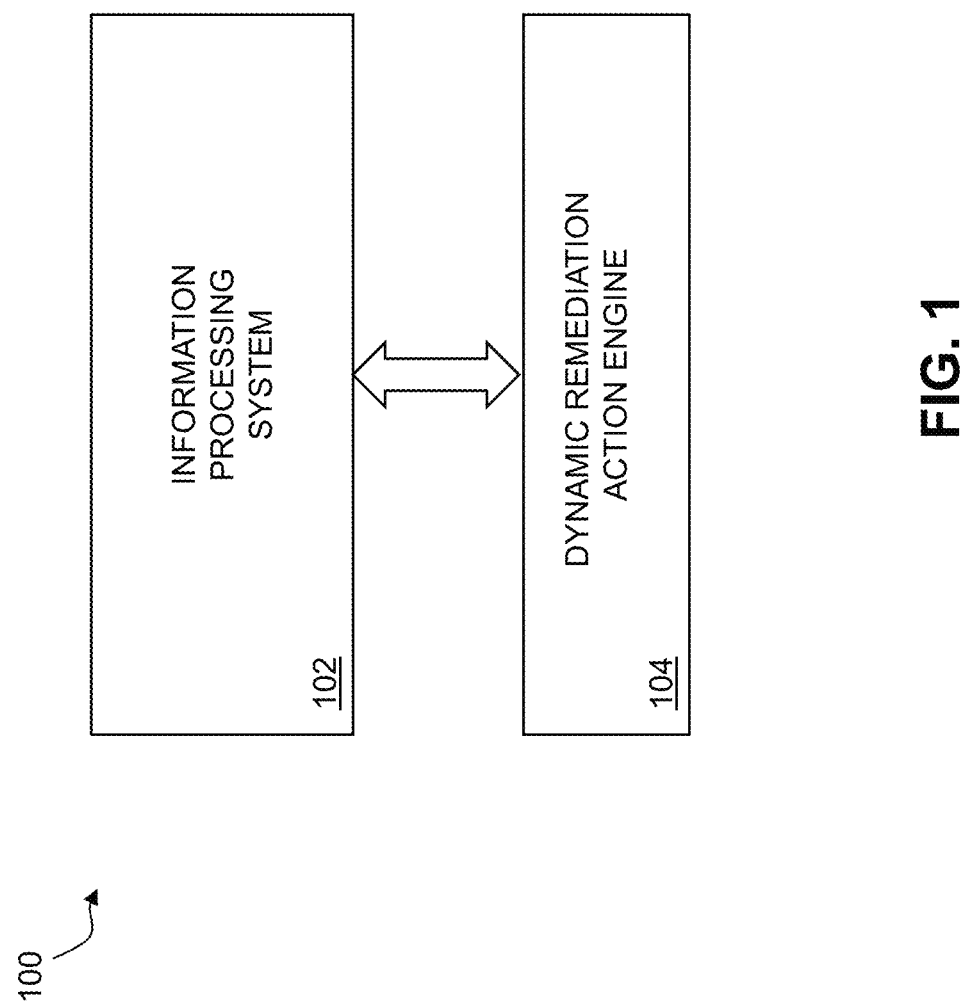
FIG. 1 illustrates an information processing system operatively coupled to a dynamic remediation action engine according to an illustrative embodiment.

As shown in an operational environment 100 in FIG. 1, an information processing system 102 is operatively coupled to a dynamic remediation action engine 104 according to an illustrative embodiment. As will be further explained, in one or more illustrative embodiments, dynamic remediation action engine 104 is configured to automatically respond to configuration issues of information processing system 102 (or parts thereof).

It is assumed that detection of configuration issues in information processing system 102 is performed by one or more system configuration checking and/or orchestration tools that reside inside information processing system 102, outside information processing system 102, or some combination of inside and outside information processing system 102.

A non-limiting set of use case examples for configuration checking and reporting with respect to information processing system 102 includes: pre-qualification of hardware components and capabilities as part of a data center readiness review; post install verification of best practices by field engineers; inspection of best practices by support engineers assigned to solve customer issues; proactive monitoring of overall health of the system; brownfield adoption to learn the existing configuration before deployment/migration; and cluster expansion. In information technology (IT), a brownfield deployment is an installation and configuration of new hardware or software that needs to or otherwise should coexist with legacy IT systems (in contrast, a greenfield deployment is an installation and configuration of new hardware or software that is not dependent on legacy IT systems).

Figure 2:
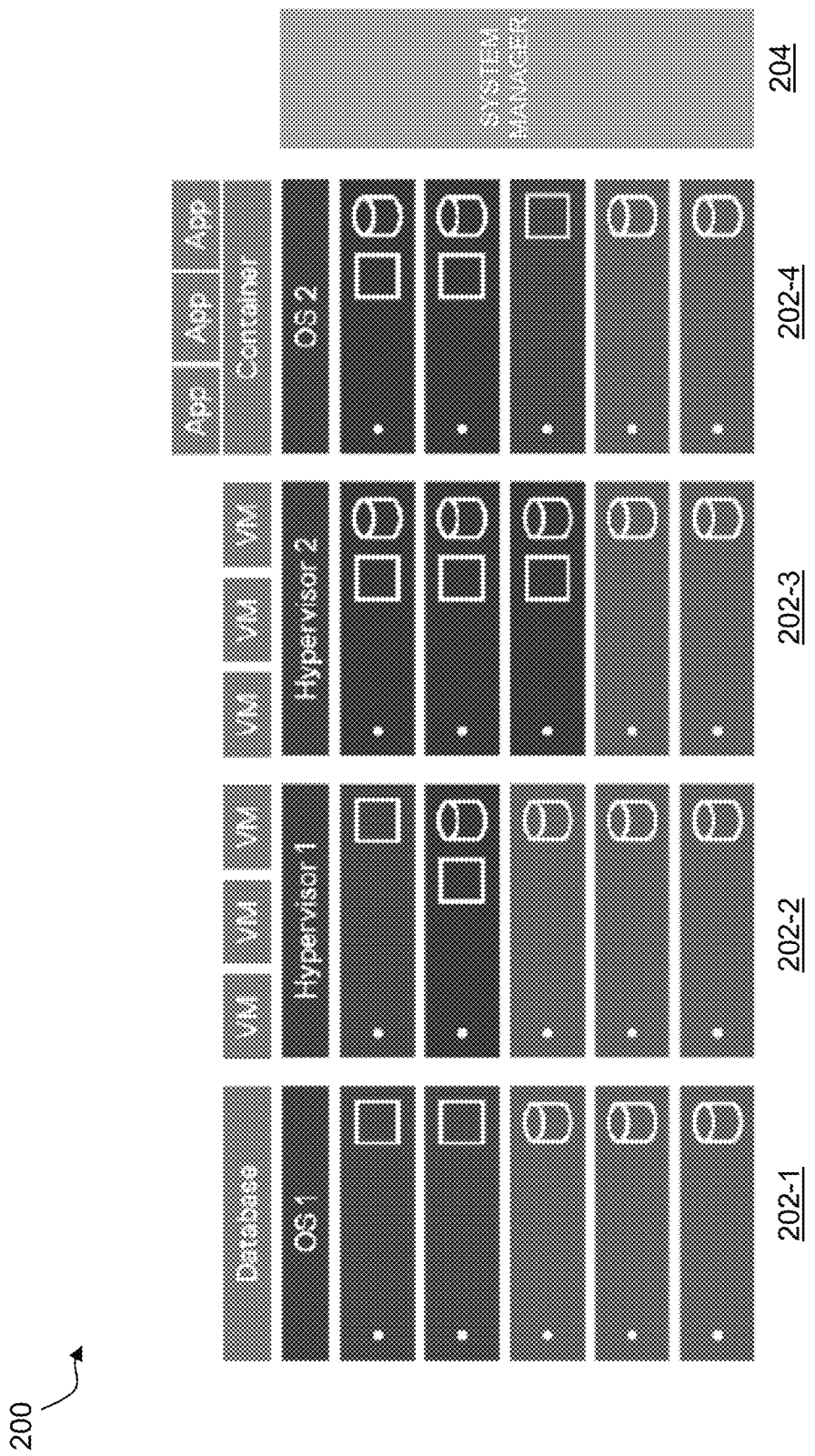
FIG. 2 illustrates an example of an information processing system in the form of a software-defined, scalable storage and compute system with which one or more illustrative embodiments may be implemented.

FIG. 2 illustrates an example of an information processing system 200 in the form of a software-defined, scalable storage and compute system with which one or more illustrative embodiments may be implemented. It is to be understood that the dynamic remediation action application functionalities described herein are not limited to use with information processing system 200.

More particularly, information processing system 200 depicts a set of equipment racks 202-1, 202-2, 202-3 and 202-4. Each equipment rack 202 is configured with a set of resources including one or more of compute resources (represented by a square symbol), storage resources (represented by a disk symbol), combination resources (represented by square and disk symbols), and others (e.g., networking resources not shown expressly shown). The set of equipment racks are managed by a system manager 204 to enable configuration of the rack and its resources to support an on-demand execution environment to host systems such as a database and its operating system, sets of virtual machines (VMs) and their hypervisors, and a container and its operating system to execute a set of application programs (Apps). By way of example only, the set of equipment racks 202-1, 202-2, 202-3 and 202-4 can be part of a data center. One example of such a set of equipment racks and system manager that comprise information processing system 200 is the VxFlex® or PowerFlex® (commercially available from Dell EMC, Hopkinton MA) integrated rack system. The VxFlex® or PowerFlex® integrated rack is a flexible hyperconverged infrastructure (HCI) rack-scale system with integrated networking that supports heterogeneous IT environments. HCI enables compute, storage and networking functions to be decoupled from the underlying infrastructure and run on a common set of resources including industry standard compute, storage and networking components, e.g., deployed within the set of equipment racks 202-1, 202-2, 202-3 and 202-4. In some illustrative embodiments, dynamic remediation action engine 104 is implemented in part or in whole within system manager 204. In alternative embodiments, dynamic remediation action engine 104 is implemented in part or in whole outside system manager 204.

Figure 3:
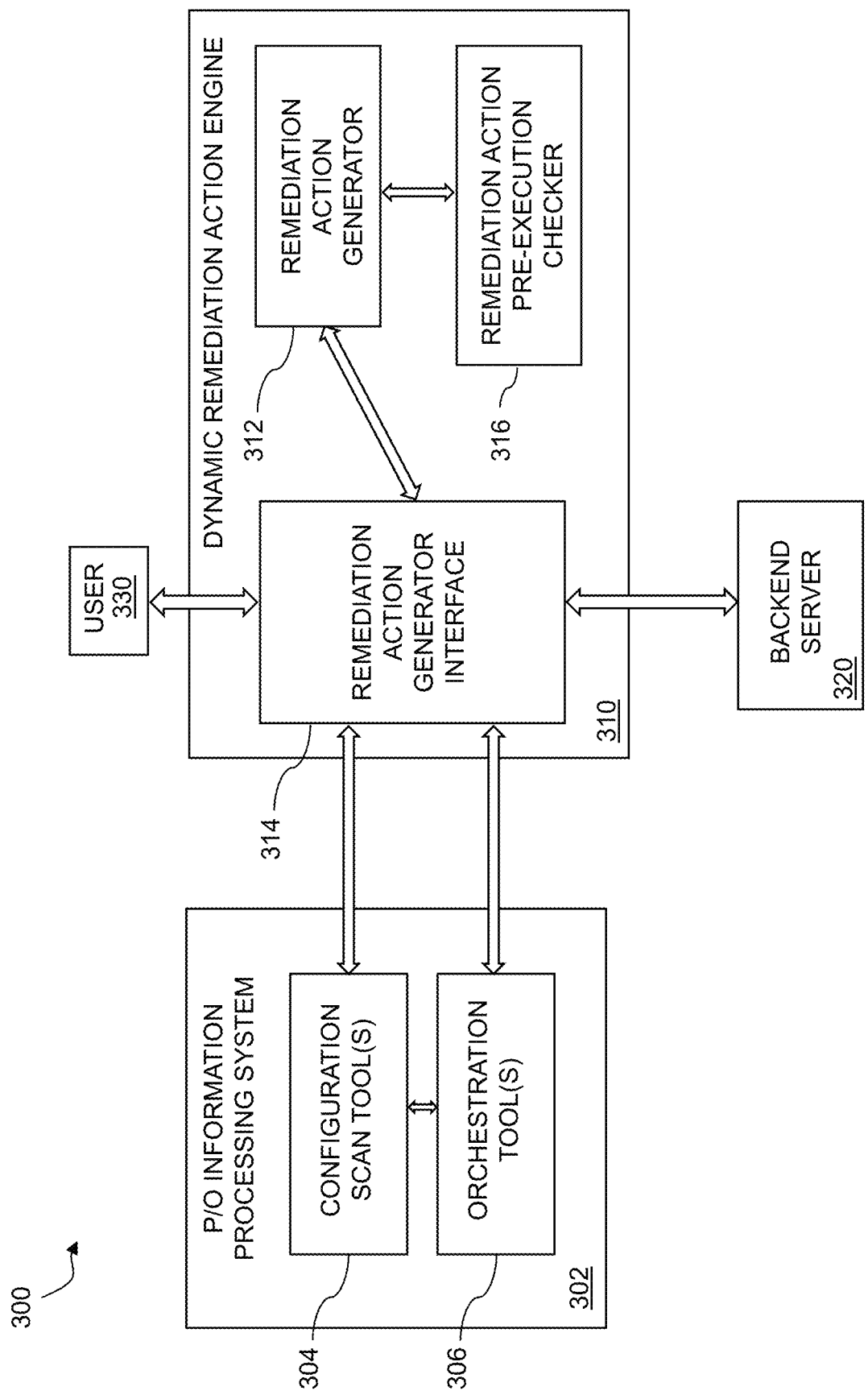
FIG. 3 illustrates an information processing system environment with a dynamic remediation action engine according to an illustrative embodiment.

FIG. 3 illustrates an information processing system environment 300 with a dynamic remediation action engine according to an illustrative embodiment. More particularly, as shown, environment 300 comprises part of an information processing system 302 (an illustrative embodiment of information processing system 102 in FIG. 1 or information processing system 200 in FIG. 2) operatively coupled to a dynamic remediation action engine 310 (an illustrative embodiment of dynamic remediation action engine 104 in FIG. 1). As further shown and as will be further explained, information processing system 302 comprises one or more configuration scan tools 304 and one or more orchestration tools 306 (which are illustrative embodiments of what is collectively referred to herein as a set of one or more interfaces of the information processing system), both of which are operatively coupled to a remediation action generator 312 through a remediation action generator interface 314. Further, the remediation action generator 312 is operatively coupled to a remediation action pre-execution checker 316. Still further, as shown, information processing system environment 300 comprises a backend server 320 which can be part of a public cloud platform, a private cloud platform, a hybrid (public and private combination) cloud platform, a non-cloud computing platform, or some combination thereof.

In some illustrative embodiments, tools 304 and 306 are standalone products while in other illustrative embodiments they are functionalities that are included as part of some software, operating system, or other component in the information processing system 302, e.g., the configuration check would be query data from such a tool and process it. Examples of such tools 304 and 306 include, but are not limited to: Cisco NX-OS (Switch Firmware/Operating System) to check network port settings; VMware vSphere to check virtual environment configuration properties; Dell iDRAC to examine physical hardware configuration settings; and CentOS internal tools such as ifconfig or ping to check settings and system behavior.

As will be explained in further detail below, dynamic remediation action engine 310 is configured to receive results (via remediation action generator interface 314) of the one or more configuration scan tools 304 that perform one or more configuration checks on elements of information processing system 302 (e.g., compute, storage, networking resources (e.g., both software and/or hardware components) in equipment racks as shown in FIG. 2). Based on the received results, dynamic remediation action engine 310 (via remediation action generator 312) automatically generates one or more remediation actions.

The one or more remediation actions generated by remediation action generator 312 are checked by remediation action pre-execution checker 316 before they are implemented. Such pre-execution checks can include, but are not limited to, automatic checks against best practices and/or existing IT policies of information processing system 302, orchestration tools available for information processing system 302 to implement the one or more remediation actions, authorization by an administrator and/or owner (i.e., user 330) of information processing system 302, and/or other criteria depending on the specific use case.

The one or more remediation actions generated by remediation action generator 312 from the scan results take into account the orchestration options already available as part of the one or more orchestration tools 306. Furthermore, the one or more remediation actions generated by remediation action generator 312 can define new system orchestration flows as needed. As mentioned above, the one or more remediation actions can be applied across information processing system 302 using at least part of the same tools (the set of one or more interfaces of the information processing system) that gave the scan results initially (i.e., configuration scan tools 304 and/or orchestration tools 306), suggested to the user 330 for implementation now or at a later time, referred to a professional service for implementation, ignored based on a customer decision, and/or other dispositions depending on the use cases. Accordingly, the remediation could be accomplished using the same tool in the set of tools that did the configuration check or a different one depending on the specific results.

In one illustrative embodiment wherein it is assumed that information processing system 302 comprises information processing system 200 in FIG. 2, the one or more remediation actions are sent (via remediation action generator interface 314 after pre-execution check by remediation action pre-execution checker 316) to system manager 204 of the PowerFlex® integrated rack system (e.g., equipment racks 202-1, 202-2, 202-3 and 202-4). System manager 204 includes orchestration capability with access to all areas of the equipment racks 202-1, 202-2, 202-3 and 202-4 and thus is uniquely positioned to take action based on the one or more remediation actions generated by remediation action generator 312.

In alternative embodiments, configuration check results can be provided to dynamic remediation action engine 310 from configuration checking mechanisms other than the one or more configuration scan tools 304.

Backend server 320, as mentioned above, can be part of a public cloud platform, a private cloud platform, a hybrid (public and private combination) cloud platform, a non-cloud computing platform, or some combination thereof. Dynamic remediation action engine 310 can send (via remediation action generator interface 314) the one or more remediation actions and/or configuration scan results to backend server 320 which, in some embodiments, executes artificial intelligence/machine learning (AI/ML) analytics on the sent data. The analytics results can then be sent back to dynamic remediation action engine 310 and used by remediation action generator 312 to add to, delete from, or otherwise modify the one or more remediation actions if needed or desired. For example, the backend server 320 can implement CloudIQ® (commercially available from Dell EMC, Hopkinton MA) which is a cloud-based application that implements intelligent and predictive analytics to proactively monitor the health of one or more storage systems (e.g., one or more of equipment racks 202-1, 202-2, 202-3 and 202-4 of FIG. 2). The backend server 320 can implement other analytics such as, but not limited to, InsideIQ® and DataIQ® (commercially available from Dell EMC, Hopkinton MA), as well as other analytics based on AWL.

Figure 4:
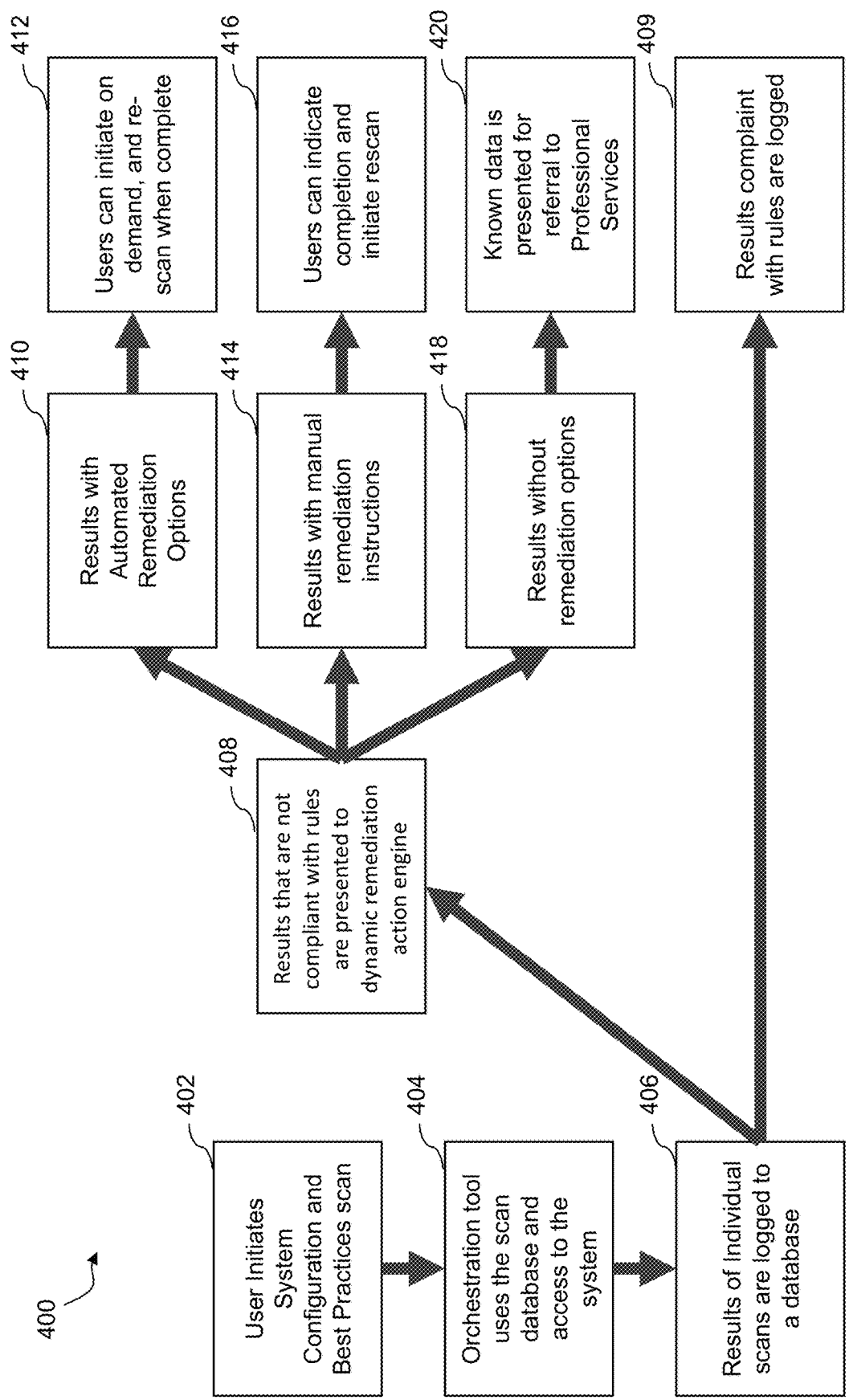
FIG. 4 illustrates a dynamic remediation action application methodology according to an illustrative embodiment.

Turning now to FIG. 4, a dynamic remediation action application methodology 400 is illustrated according to an illustrative embodiment. It is to be appreciated that, in illustrative embodiments, methodology 400 is executed in accordance with information processing system environment 300 of FIG. 3; however, alternative embodiments are not limited thereto.

In step 402, assume a user (or some semi-automated or automated mechanism) initiates one or more system configuration and best practices scans on information processing system 302 using the one or more configuration scan tools 304 or some other configuration checking mechanism. Recall, as described above, reasons for performing the one or more scans may include, but are not limited to, pre-qualification of hardware components and capabilities as part of a data center readiness review; post install verification of best practices by field engineers; inspection of best practices by support engineers assigned to solve customer issues; proactive monitoring of overall health of the system; brownfield adoption to learn the existing configuration before deployment/migration; and cluster expansion.

In step 404, assume that the one or more orchestration tools 306 employ a scan database (part of information processing system 300 but not expressly shown in FIG. 3) and access the elements/components of information processing system 300 to implement the scan. In step 406, results of individual scans are logged to the scan database.

In step 408, results that are not compliant with rules (e.g., best practices and/or other IT configuration policies) are presented to the dynamic remediation action engine 310 for evaluation and generation of one or more remediation actions as explained herein, while compliant results are separately logged in step 409 (e.g., at information processing system 302, dynamic remediation action engine 310, or both). It is assumed that the one or more remediation actions are also presented to user 330 such as a data center administrator and/or data center owner/service provider. Once remediation actions are generated by remediation action generator 312 for scan results, dynamic remediation action engine 310 initiates and/or causes initiation of one or more options as illustrated in steps 410 through 420.

Scan results with automated remediation options (i.e., capable of automatic or semi-automatic implementation or deployment) are sent in step 410 to the one or more orchestration tools 306 in information processing system 302 and they can be initiated on demand (with user 330 authorization) in step 412. In some embodiments, no user initiation is required and the remediation actions are initiated automatically. A rescan can then be performed by the one or more configuration tools 304 to confirm that the configuration issue/error has been corrected by the remediation action. If the configuration issue/error has not been remedied by the remediation action, or a new configuration issue/error has been detected, remediation action evaluation and generation can be performed again by dynamic remediation action engine 310.

Scan results with manual remediation options are sent in step 414 to user 330 and the user 330 can initiate or otherwise perform the manual action (e.g., replace a storage drive or other system component) and indicate completion in step 416. As explained above, a rescan can be performed and dynamic remediation action evaluation and generation performed again if needed or desired.

Scan results with no remediation options are sent in step 418 to user 330 and/or backend server 320 such that the results and any other known data can be referred to a professional service (i.e., third party) for remediation in step 420. For example, assume the configuration issue/error requires the administrator to contact an equipment vendor to resolve the issue/error. As explained above, after any third party remediation, a rescan can be performed and dynamic remediation action evaluation and generation performed again if needed or desired.

FIGS. 5A and 5B illustrate check and remediation database examples 500 and 510, respectively, according to illustrative embodiments. It is to be understood that each example illustrates sample code that results from remediation action engine 310 based on scan results it receives and processes.

In example 500 of FIG. 5A, assume that check and remediation steps contain specific application programming interface (API) calls, commands, or actions. The checks and actions can be expressed in a common language that orchestration tools (e.g., system manager 204 in FIG. 2) can process. For example, as shown, the code contains checks, remediation, and if/else conditions. Each check is expressed in a system database and loaded during execution. By way of one non-limiting example, the code in example 500 can be delivered as an Extensible Markup Language (XML)/ JavaScript Object Notation (JSON) file to be processed by the information processing system being managed.

Example 510 of FIG. 5B, similar to example 500, is intended to be an illustration of the concept and not necessarily a description of the complete or appropriate syntax in the definition file (code). Furthermore, it is to be understood that any scan database used in configuration checking is independent of the dynamic remediation action engine 310 such that new and varied configuration checks can evolve separately from the dynamic remediation action engine 310. Further, in some embodiments, the database of checks can be versioned such that the evolution of the results can be tracked and understood with respect to the check that was executed.

Accordingly, the remediation could be accomplished using the same tool in the set of tools that did the configuration check or a different one depending on the specific results. For example in FIG. 5B, the check action uses the esxcli tool (specifically the "esxcli network vswitch dvs vmware . . . " formulation). The check action is "list" while the remediation action is "set." This scenario is using the same tool for both. In a different example, a result from a specific scan tool to check a more complex system behavior, e.g., one that spans multiple components of the information processing system, may require an orchestration workflow in order to remediate.

Advantageously, as explained herein, illustrative embodiments provide remediation functionalities to take action on scan results immediately or otherwise contemporaneously, and from the same interface that reported that result. The remediation functionalities can also be applied to run a pre-execution check on proposed actions for safety, and prevent conditions that lead to known data unavailable (DU), data loss (DL), and other loss-of-functionality situations. Further, since the remediation functionalities can be built into the database of configuration and best practices checks, this capability is dynamic and can add new capabilities easily. In some embodiments, the remediation functionalities can be delivered via existing message-passing tools such as, but not limited to, Secure Remote Services (commercially available from Dell EMC, Hopkinton MA) enabling over-the-air (OTA) updates. As an example, a newly discovered preventable DU/DL check could be pushed rapidly so that customers are protected from the condition.

Figure 6:
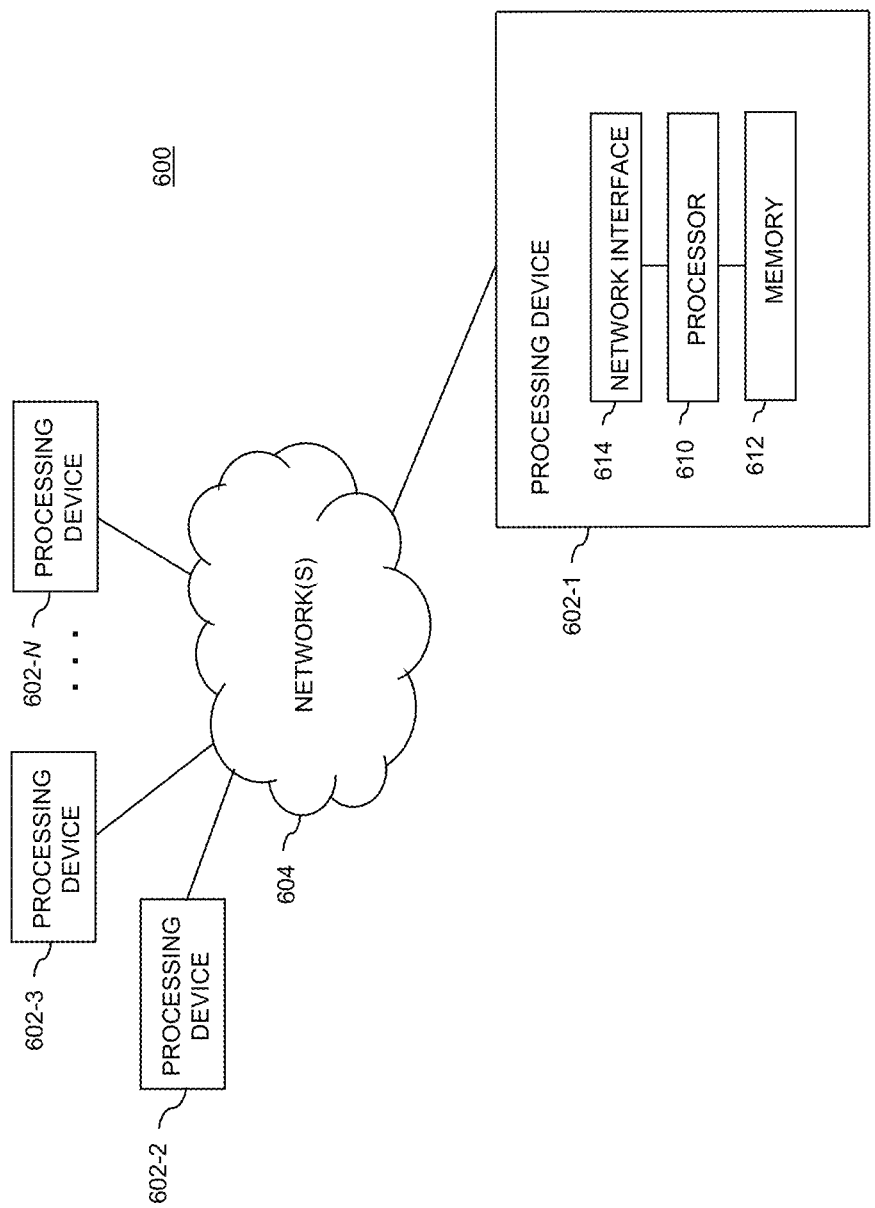
FIG. 6 illustrates a processing platform used to implement an information processing system with dynamic remediation action application functionalities according to an illustrative embodiment.

FIG. 6 depicts a processing platform 600 used to implement system configuration management with dynamic remediation according to an illustrative embodiment. More particularly, processing platform 600 is a processing platform on which a computing environment with functionalities described herein (e.g., FIGS. 1-5B and otherwise described herein) can be implemented.

The processing platform 600 in this embodiment comprises a plurality of processing devices, denoted 602-1, 602-2, 602-3, . . . 602-N, which communicate with one another over network(s) 604. It is to be appreciated that the methodologies described herein may be executed in one such processing device 602, or executed in a distributed manner across two or more such processing devices 602. It is to be further appreciated that a server, a client device, a computing device or any other processing platform element may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 602 shown in FIG. 6. The network(s) 604 represent one or more communications networks that enable components to communicate and to transfer data therebetween, as well as to perform other functionalities described herein.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random-access memory (RAM), read-only memory (ROM) or other types of memory, in any combination. The one or more software programs when executed by a processing device such as the processing device 602-1 causes the device to perform functions associated with one or more of the components/steps of system/methodologies in FIGS. 1-5B. One skilled in the art would be readily able to implement such software given the teachings provided herein. Other examples of processor-readable storage media embodying embodiments of the invention may include, for example, optical or magnetic disks.

Processing device 602-1 also includes network interface circuitry 614, which is used to interface the device with the networks 604 and other system components. Such circuitry may comprise conventional transceivers of a type well known in the art.

The other processing devices 602 (602-2, 602-3, . . . 602-N) of the processing platform 600 are assumed to be configured in a manner similar to that shown for computing device 602-1 in the figure.

The processing platform 600 shown in FIG. 6 may comprise additional known components such as batch processing systems, parallel processing systems, physical machines, virtual machines, virtual switches, storage volumes, etc. Again, the particular processing platform shown in this figure is presented by way of example only, and the system shown as 600 in FIG. 6 may include additional or alternative processing platforms, as well as numerous distinct processing platforms in any combination.

Also, numerous other arrangements of servers, clients, computers, storage devices or other components are possible in processing platform 600. Such components can communicate with other elements of the processing platform 600 over any type of network, such as a wide area network (WAN), a local area network (LAN), a satellite network, a telephone or cable network, or various portions or combinations of these and other types of networks.

Furthermore, it is to be appreciated that the processing platform 600 of FIG. 6 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 600 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-6 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
at least one processing device comprising a processor coupled to a memory;
the at least one processing device, when executing program code, is configured to:
receive results from one or more configuration checks performed on one or more elements of an information processing system, wherein the one or more configuration checks are accessible via a database in the information processing system, and wherein the results are received from a set of one or more interfaces of the information processing system and comprise an indication of detection of a configuration issue with at least a portion of the one or more elements of the information processing system;
identify one or more remediation actions in response to at least a portion of the results received from the one or more configuration checks, wherein the one or more remediation actions are at least in part accessible via the same database in the information processing system as are the one or more configuration checks;
evaluate the one or more remediation actions against one or more configuration policies associated with the information processing system, wherein the one or more configuration policies are accessible via the same database in the information processing system as are the one or more configuration checks;
cause initiation of the one or more remediation actions within the information processing system at least in part through the same set of one or more interfaces of the information processing system from which the results are received to effectuate remediation of the configuration issue with the portion of the one or more elements of the information processing system, and wherein causing initiation of the one or more remediation actions within the information processing system is performed simultaneously with receiving the results from the one or more configuration checks;
receive results from re-performance of the one or more configuration checks on one or more elements of an information processing system following application of the one or more remediation actions;
in response to determining the configuration issue is not resolved by the one or more remediation actions, access one or more further remediation actions in the database based on at least a portion of the received results;
cause simultaneous initiation of the one or more further remediation actions within the information processing system to effectuate remediation of the configuration issue with the portion of the one or more elements of the information processing system; and
dynamically add one or more additional remediation actions to the database for access and initiation to effectuate remediation of one or more newly discovered configuration issues, wherein an execution check is performed on the one or more additional remediation actions before adding the one or more additional remediation actions to the database;
wherein the database used in the one or more configuration checks is separate from the apparatus used in the dynamic adding of one or more additional remediation actions such that one or more additional configuration checks are dynamically added separately from the dynamic adding of one or more additional remediation actions, which enables:
- the one or more additional configuration checks to be dynamically added while the one or more remediation actions are simultaneously added or initiated; and
- the one or more additional remediation actions to be dynamically added while the one or more configuration checks are simultaneously added or initiated;

wherein the received results from the one or more configuration checks and the one or more additional configuration checks are versioned and thereby tracked such that the received results are traceable to a version of the configuration check that was executed; and wherein one or more of the results of the one or more configuration checks and the one or more remediation action are sent to an external platform for artificial intelligence/machine learning (AI/ML) analysis.

2. The apparatus of claim 1, wherein the at least one processing device, when executing program code, is further configured to send the one or more remediation actions to a user for authorization before causing initiation of the one or more remediation actions.

3. The apparatus of claim 1, wherein the at least one processing device, when executing program code, is further configured to generate code executable by the information processing system that defines the one or more remediation actions to effectuate remediation of the configuration issue.

4. The apparatus of claim 1, wherein the at least one processing device, when executing program code, is further configured to cause initiation of automatic performance of the one or more remediation actions to effectuate remediation of the configuration issue with the portion of the one or more elements of the information processing system.

5. The apparatus of claim 1, wherein the at least one processing device, when executing program code, is further configured to cause initiation of manual performance of the one or more remediation actions to effectuate remediation of the configuration issue with the portion of the one or more elements of the information processing system.

6. The apparatus of claim 1, wherein the at least one processing device, when executing program code, is further configured to cause initiation of third party performance of the one or more remediation actions to effectuate remediation of the configuration issue with the portion of the one or more elements of the information processing system.

7. A method comprising:
receiving results from one or more configuration checks performed on one or more elements of an information processing system, wherein the one or more configuration checks are accessible via a database in the information processing system, and wherein the results are received from a set of one or more interfaces of the information processing system and comprise an indication of detection of a configuration issue with at least a portion of the one or more elements of the information processing system;

identifying one or more remediation actions in response to at least a portion of the results received from the one or more configuration checks, wherein the one or more remediation actions are at least in part accessible via the same database in the information processing system as are the one or more configuration checks;

evaluating the one or more remediation actions against one or more configuration policies associated with the information processing system, wherein the one or more configuration policies are accessible via the same database in the information processing system as are the one or more configuration checks;

causing initiation of the one or more remediation actions within the information processing system at least in part through the same set of one or more interfaces of the information processing system from which the results are received to effectuate remediation of the configuration issue with the portion of the one or more elements of the information processing system, and wherein causing initiation of the one or more remediation actions within the information processing system is performed simultaneously with receiving the results from the one or more configuration checks;

receiving results from re-performance of the one or more configuration checks on one or more elements of an information processing system following application of the one or more remediation actions;

in response to determining the configuration issue is not resolved by the one or more remediation actions, accessing one or more further remediation actions in the database based on at least a portion of the received results;

causing simultaneous initiation of the one or more further remediation actions within the information processing system to effectuate remediation of the configuration issue with the portion of the one or more elements of the information processing system; and dynamically adding one or more additional remediation actions to the database for access and initiation to effectuate remediation of one or more newly discovered configuration issues, wherein an execution check is performed on the one or more additional remediation actions before adding the one or more additional remediation actions to the database;

wherein the steps are performed by at least one processing device comprising a processor coupled to a memory when executing program code;

wherein the database used in the one or more configuration checks is separate from an apparatus used in the dynamic adding of one or more additional remediation actions such that one or more additional configuration checks are dynamically added separately from the dynamic adding of one or more additional remediation actions, which enables:
- the one or more additional configuration checks to be dynamically added while the one or more remediation actions are simultaneously added or initiated; and
- the one or more additional remediation actions to be dynamically added while the one or more configuration checks are simultaneously added or initiated;

wherein the received results from the one or more configuration checks and the one or more additional configuration checks are versioned and thereby tracked such that the received results are traceable to a version of the configuration check that was executed; and wherein one or more of the results of the one or more configuration checks and the one or more remediation action are sent to an external platform for artificial intelligence/machine learning (AI/ML) analysis.

8. The method of claim 7, further comprising sending the one or more remediation actions to a user for authorization before causing initiation of the one or more remediation actions.

9. The method of claim 7, further comprising generating code executable by the information processing system that defines the one or more remediation actions to effectuate remediation of the configuration issue.

10. The method of claim 7, further comprising causing initiation of automatic performance of the one or more remediation actions to effectuate remediation of the configuration issue with the portion of the one or more elements of the information processing system.

11. The method of claim 7, further comprising causing initiation of manual performance of the one or more remediation actions to effectuate remediation of the configuration issue with the portion of the one or more elements of the information processing system.

12. The method of claim 7, further comprising causing initiation of third party performance of the one or more remediation actions to effectuate remediation of the configuration issue with the portion of the one or more elements of the information processing system.

13. A computer program product comprising a non-transitory processor-readable storage medium having stored therein program code of one or more software programs, wherein the program code when executed by at least one processing device causes the at least one processing device to perform steps of:
   receiving results from one or more configuration checks performed on one or more elements of an information processing system, wherein the one or more configuration checks are accessible via a database in the information processing system, and wherein the results are received from a set of one or more interfaces of the information processing system and comprise an indication of detection of a configuration issue with at least a portion of the one or more elements of the information processing system;
   identifying one or more remediation actions in response to at least a portion of the results received from the one or more configuration checks, wherein the one or more remediation actions are at least in part accessible via the same database in the information processing system as are the one or more configuration checks;
   evaluating the one or more remediation actions against one or more configuration policies associated with the information processing system, wherein the one or more configuration policies are accessible via the same database in the information processing system as are the one or more configuration checks;
   causing initiation of the one or more remediation actions within the information processing system at least in part through the same set of one or more interfaces of the information processing system from which the results are received to effectuate remediation of the configuration issue with the portion of the one or more elements of the information processing system, and wherein causing initiation of the one or more remediation actions within the information processing system is performed simultaneously with receiving the results from the one or more configuration checks;
   receiving results from re-performance of the one or more configuration checks on one or more elements of an information processing system following application of the one or more remediation actions;
   in response to determining the configuration issue is not resolved by the one or more remediation actions, accessing one or more further remediation actions in the database based on at least a portion of the received results;
   causing simultaneous initiation of the one or more further remediation actions within the information processing system to effectuate remediation of the configuration issue with the portion of the one or more elements of the information processing system; and
   dynamically adding one or more additional remediation actions to the database for access and initiation to effectuate remediation of one or more newly discovered configuration issues, wherein an execution check is performed on the one or more additional remediation actions before adding the one or more additional remediation actions to the database;
   wherein the database used in the one or more configuration checks is separate from an apparatus used in the dynamic adding of one or more additional remediation actions such that one or more additional configuration checks are dynamically added separately from the dynamic adding of one or more additional remediation actions, which enables:
      the one or more additional configuration checks to be dynamically added while the one or more remediation actions are simultaneously added or initiated; and
      the one or more additional remediation actions to be dynamically added while the one or more configuration checks are simultaneously added or initiated;
   wherein the received results from the one or more configuration checks and the one or more additional configuration checks are versioned and thereby tracked such that the received results are traceable to a version of the configuration check that was executed; and
   wherein one or more of the results of the one or more configuration checks and the one or more remediation action are sent to an external platform for artificial intelligence/machine learning (AI/ML) analysis.

14. The apparatus of claim 1, wherein evaluating the one or more remediation actions further comprises identifying at least an available subset of the set of one or more interfaces available to perform at least a portion of the step of causing initiation.

15. The method of claim 7, wherein evaluating the one or more remediation actions further comprises identifying at least an available subset of the set of one or more interfaces available to perform at least a portion of the step of causing initiation.

16. The computer program product of claim 13, wherein the at least one processing device, when executing program code, is further configured to send the one or more remediation actions to a user for authorization before causing initiation of the one or more remediation actions.

17. The computer program product of claim 13, wherein the at least one processing device, when executing program code, is further configured to generate code executable by the information processing system that defines the one or more remediation actions to effectuate remediation of the configuration issue.

* * * * *